United States Patent [19]

Cosco

[11] 4,105,929

[45] Aug. 8, 1978

[54] SHUNT TRIGGERED FLASHTUBE HAVING SAFETY FEATURE

[75] Inventor: Robert J. Cosco, Amesbury, Mass.

[73] Assignee: GTE Sylvania Incorporated, Danvers, Mass.

[21] Appl. No.: 701,381

[22] Filed: Jun. 30, 1976

[51] Int. Cl.[2] .................... H05B 41/30; H02H 7/20

[52] U.S. Cl. .................... 315/125; 315/241 R; 328/10; 361/56

[58] Field of Search ............ 315/241 S, 241 R, 241 P, 315/125, 183, 74, 75; 361/56; 328/8, 9, 10

[56] References Cited

U.S. PATENT DOCUMENTS

| | | | |
|---|---|---|---|
| 2,397,337 | 3/1946 | Clough | 328/9 |
| 2,542,345 | 2/1951 | Miles | 313/201 |
| 2,878,422 | 3/1959 | Stoelting | 315/125 X |
| 3,748,989 | 12/1971 | Ban | 315/241 P X |
| 3,965,393 | 3/1971 | Chamberlain | 315/119 X |
| 4,047,064 | 9/1977 | Cosco et al. | 313/201 |

*Primary Examiner*—Alfred E. Smith
*Assistant Examiner*—Charles F. Roberts
*Attorney, Agent, or Firm*—James Theodosopoulos

[57] ABSTRACT

A flashtube has an hermetically sealed glass envelope containing an inert gas and a pair of electrodes between which an arc discharge path is defined during lamp operation, and an insulated external trigger wire at the outer surface of the envelope. The trigger circuit includes a safety feature in the form of a sealed spaced gap to prevent an arc from occurring in the flashtube in the event that the flashtube envelope is cracked or broken.

1 Claim, 2 Drawing Figures

SHUNT TRIGGERED FLASHTUBE HAVING SAFETY FEATURE

THE INVENTION

This invention relates to pulsing electric discharge flashtubes. Such tubes generally comprise two spaced apart electrodes within a sealed glass envelope having an inert gas fill, typically xenon, at a subatmospheric pressure. The invention is particularly concerned with tubes having an external trigger wire wrapped around the envelope, such as is shown in U.S. Pat. No. 3,840,766, the disclosure of which is incorporated herein by reference.

In some cases it is undesirable for the external trigger wire to be exposed, since an external arc could occur between the trigger wire and a proximate grounded object, such as the fixture on which the lamp is mounted. A copending application, Ser. No. 696,667, filed June 16, 1976, now U.S. Pat. No. 4,047,064, entitled "Flash Tube Having Enclosed Trigger Wire", discloses a flashtube in which the occurrence of such an external arc is substantially prevented because the trigger wire is insulated from the ambient atmosphere.

This invention is concerned with preventing an external arc in the event that the flashtube envelope becomes cracked or broken. Such a safety feature is desirable where the flashtube is used in an environment that could contain flammable fumes. The safety feature incorporates a sealed spark gap in the trigger circuit of the flashtube in parallel with the flashtube (via captive coupling). The spark gap has a breakdown voltage that is higher than that of the normal flashtube but lower than that of the flashtube when air has leaked thereinto.

Figure 1:
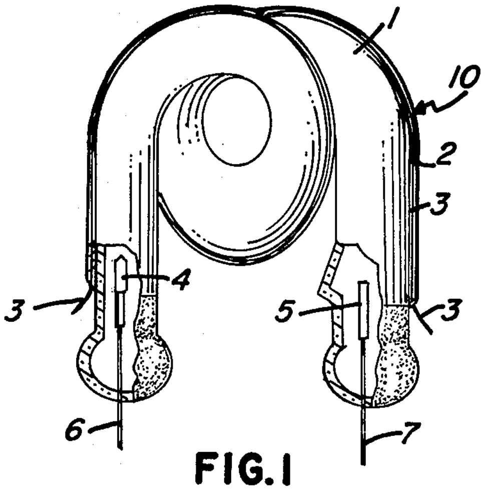
FIG. 1 is an elevational view of a flashtube having an external enclosed trigger wire.

In one embodiment, as shown in the drawing, flashtube 10 comprised an hermetically sealed envelope 1 formed of a helically shaped length of hard glass tubing, for example, No. 7740 glass. Fused to the outer surface of envelope 1 was a shorter length of suitable smaller diameter glass tubing 2 in which tungsten trigger wire 3 was enclosed. Sealed within the ends of envelope 1 were a cathode electrode 4 and an anode electrode 5. Envelope 1 was filled with an inert gas, typically xenon, at a subatmospheric pressure, for example, 120 torr. Electrodes 4 and 5 can be energized via lead-in wires 6 and 7 which are sealed through respective ends of glass envelope 1. Glass tubing 2 consisted of No. 3320 glass the coefficient of expansion of which is intermediate that of tungsten and the 7740 glass and yet is sufficiently close to both to permit sealing thereto. The unenclosed ends of trigger wire 3 are insulated from the atmosphere by, for example, embedding the ends of envelope 1 in a suitable electrically insulative rubber or plastic as disclosed in copending application Ser. No. 696,667, now U.S. Pat. No. 4,047,064.

Figure 2:
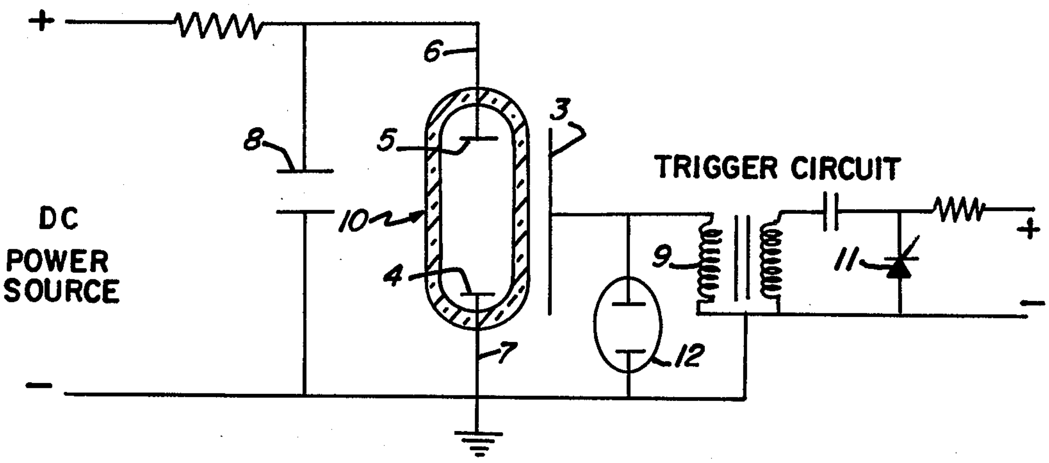
FIG. 2 is a schematic diagram showing an enclosed spark gap in accordance with this invention in parallel with the trigger wire.

As shown in FIG. 2, dc power is supplied between electrodes 4 and 5. The main discharge capacitor is capacitor 8. The trigger circuit is shown on the right and includes a pulse transformer 9 and a timed silicon control rectifier 11. The trigger pulse is delivered to trigger wire 3 which ionizes the gas in flashtube 10 and initiates the flash. In parallel with flashtube 10 is an enclosed spark gap 12. The breakdown voltage of spark gap 12 is higher than that of flashtube 10. For example, in a type 4325 flashtube, the distance between trigger wire 3 and cathode 4 is 1.65 mm, the average power rating is 25 watts, the fill is xenon at 120 torr and the flashtube ionizes reliably at a trigger pulse of 3000 volts. But if envelope 1 cracks or breaks, and air enters therein, the breakdown voltage increases to 8000 volts. Thus, the breakdown voltage of spark gap 12 should be between 3000 volts and 8000 volts. In this case spark gap 12 could consist of a type 4432 flashtube, slightly modified to reduce its normal breakdown level of 6–10 kilovolts to 5–7 kilovolts. The slight modification could consist of increasing the pressure of the 250 torr xenon fill therein slightly or reducing the 86 mm distance between its two electrodes. Thus, if envelope 1 cracked, leaking air thereinto, the arc would occur within enclosed spark gap 12 and not be exposed to the ambient atmosphere.

I claim:

1. In the circuit for a flashtube having an hermetically sealed glass envelope containing an inert gas and a pair of electrodes between which an arc discharge path is defined during lamp operation and having an external trigger wire which is insulated from the ambient atmosphere, the improvement which comprises an enclosed spark gap connected to the trigger wire, the breakdown voltage of the spark gap being higher than that of the normal flashtube but lower than that of the flashtube when air has leaked thereinto, thereby preventing an external arc from occurring when the flashtube becomes cracked or broken.

* * * * *